3,161,523
METHOD OF PREPARING AN INCOMPLETELY COOKED SLICED LOAF OF BREAD
Lewis John Ort, La Vale, Md., assignor to Ort Brothers Bakery, Inc., Cumberland, Md., a corporation of Maryland
Filed Oct. 11, 1961, Ser. No. 144,393
5 Claims. (Cl. 99—90)

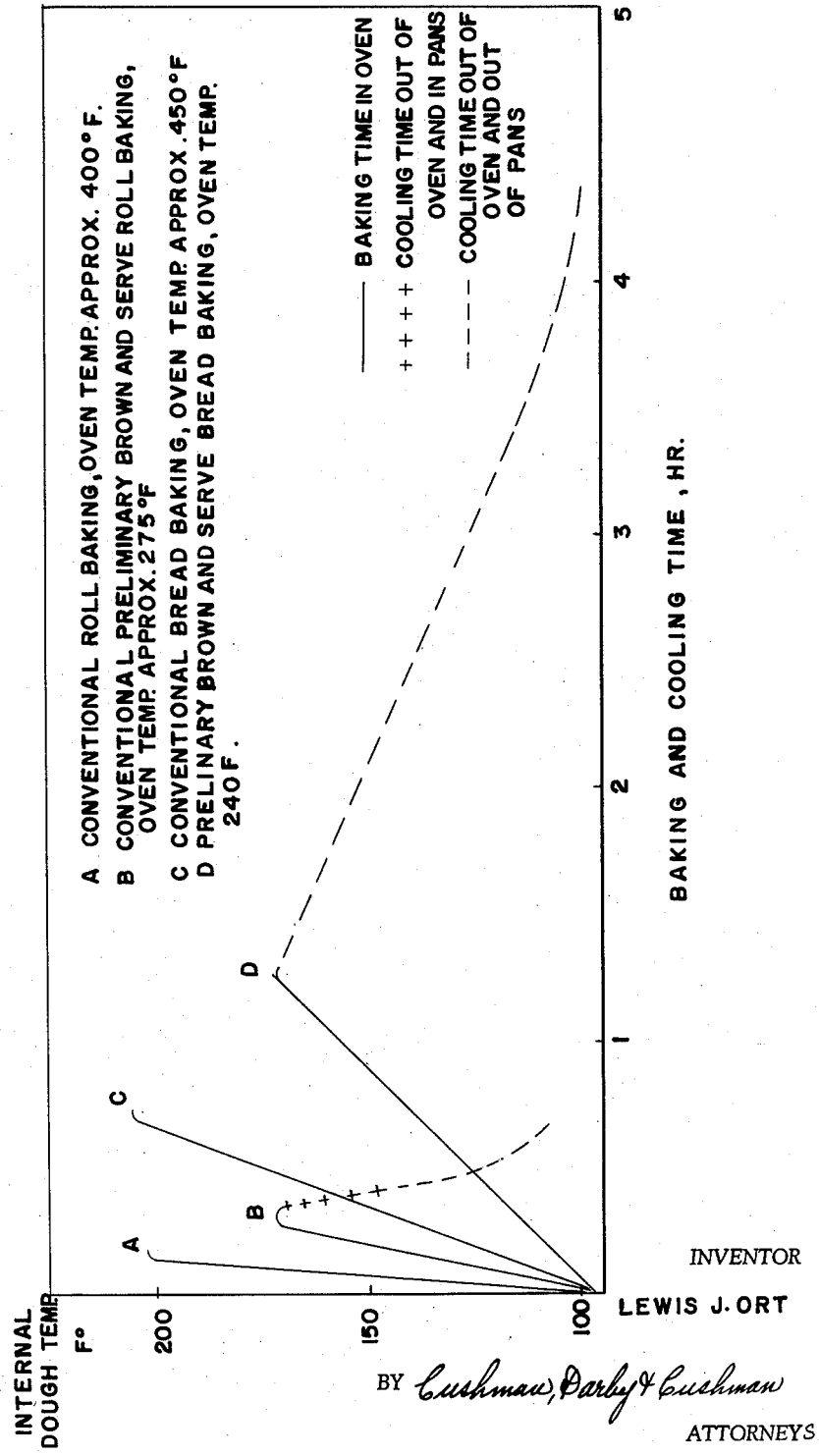

The present invention relates to a process for and has for its primary object the preparation of a semi-baked, sliced bread which when toasted immediately prior to serving forms toast of improved texture and flavor.

In recent years semi-baked dinner rolls and various sweet rolls, often referred to as brown-and-serve baked goods, have become popular retail food items. These semi-baked goods, when browned at relatively high oven temperatures in the home are of excellent quality and flavor and have found wide aceptance by housewives due not only to their palatability but also to the ease with which they may be prepared in the home.

In conventional brown and serve practice, any standard dough for baked goods is divided into the desired size and semi-baked at a bakery under controlled conditions of temperature and baking time so as to substantially fully cook the dough while avoiding the formation of a crust on the outer surface and avoiding browning of the outer surface. More in particular, the baking conditions are adjusted so as to substantially complete gelatinization of the starch and liberation of carbon dioxide by yeast action and to then arrest the yeast action. The semi-baked product then has sufficient rigidity to withstand removal from the oven and subsequent handling and packaging without collapsing. In addition, the semi-baked product has a relatively high moisture content. The consumer prepares the product for eating by a final baking step during which the desired crust and browning of the same is obtained and during which the moisture content is reduced to that of a freshly baked item.

Further details of the preparation of brown and serve dinner rolls, sweet rolls and hearth bread (e.g., French bread) appear in U.S. Patent No. 2,549,595 and in a series of eleven articles in Bakers Weekly beginning with the issue of June 12, 1950, and continuing through the issue of August 21, 1950.

It is apparent that the crusting and browning action during the final baking step for the abovementioned rolls and hearth bread occurs only on exterior surfaces of the article. The inside of the article remains relatively unaffected, it being merely heated and having its moisture content reduced to substantially that of a freshly-baked article. The result is a roll or loaf of hearth bread which to the senses of sight and taste has been freshly-baked and which is substantially indistinguishable from the same article if prepared by a conventional one step baking process.

It has now been found that toast of distinct flavor and appearance can be made in the home from a semi-baked, sliced loaf of bread of conventional soft bread composition. That is, when a conventional soft bread composition is semi-baked by the process of the present invention, sliced and later toasted either in an oven or an electric toaster, the toast formed has a flavor and appearance not possessed by toast formed from conventional fully cooked bread. This difference, particularly the difference in flavor, is due to the fact that the browning, or caramelization, during the toasting step takes place on a surface of the inner crumb, or soft part, of the loaf rather than on a surface which has been exposed previously to browning factors during the initial baking step. The flavor of toast produced in this manner is almost that of the interior of a freshly baked biscuit and differs radically from the type of flavor produced in browning outside surfaces that have been previously exposed to browning factors and from the flavor of conventional toast made from wholly cooked bread. It has further been found that if soda is added to the dough as an additional leavening agent, the resulting loaf has better slicing and toasting qualities.

In carrying out the process of the present invention, the general principles of the known brown and serve baking process are observed in order to complete the gelantinization of the starch to maintain a relatively high internal moisture content and to avoid crusting and browning.

That is to say, baking conditions may in general be varied and controlled to the extent taught in the abovementioned patent and journal articles. There are, however, several important differences in the process of the invention which must be observed if the product is to achieve the desired characteristics. Briefly, the process of the invention is carried out using conventional soft bread formulas and comprises a mixing step for forming a dough, a molding step in which the dough is scaled to loaf portions of the desired size and immediately placed in baking pans, a proofing step during which the dough is fully raised into a voluminous loaf and a baking step during which the dough is substantially cooked but does not become crusted or browned. The bread is then removed from the oven, immediately dumped from the pans and allowed to cool for 4 or 5 hours at a room temperature of about 70° F. in an atmosphere no higher than 60% relative humidity. The resulting loaf has no browned exterior and substantially no crust, but the exterior thereof has sufficient rigidity or firmness to permit its being sliced by conventional bread-slicing equipment. That is, the loaf will withstand knife pressure without collapsing. The sliced bread is then ready for packaging and distribution to the consumer and may be kept under refrigeration for two or more weeks and for greater periods of time if stored in a freezer.

One of the important differences between conventional brown and serve baking processes and the process of the present invention lies in the omission in the present process of molding or overhead proofing time. After the ingredients have been mixed, the loaves are scaled and taken immediately in this state to the baking pans for rising and ovening. It has been found that even slight molding will alter the flavor of the final toasted slices and it is agreed that the flavor is improved when no molding is used.

Another important difference between conventional process and the present process lies in the length of time allowed for proofing. As is pointed out in the previously mentioned Patent No. 2,549,595 proofing time in the process described therein should be approximately one-half to two-thirds the regular proofing time used for ordinary baking. If excessive proofing time is allowed, the product of that process will shrink or wrinkle after the baking period as a result of excessive expansion during baking. In the process of the present invention, proofing time for a voluminous loaf of bread must be allowed otherwise the slices will not have the biscuit type of appeal after toasting. The actual time of proofing will depend on the temperature as will be understood.

Yet another important difference in the present process lies in the handling of the product at the point of removal from the baking pans. It has been found that in the preparation of soft bread which is to be sliced in the semi-baked condition, the loaves must be dumped from the pans immediately upon removal from the oven and thereafter allowed to cool naturally at room temperature for at least 4 or 5 hours. This procedure differs from the conventional brown and serve process in that in the latter, the product is retained in the pan for a period after removal from the oven. Further, in the present process, it is not possible to artifically cool the product, and the relative humidity of the cooling room must be kept no higher than 60%. This procedure insures that the exterior of the loaf undergoes a drying or firming action so that, when the loaf is sliced, the knife blades upon entry will not cause a crushing action.

This difference in handling is illustrated diagramatically in FIGURE 1 wherein the relative baking and cooling times of regular rolls and bread and of brown and serve rolls and bread are plotted against internal dough temperature. As is pointed out in Patent No. 2,549,595, the internal dough temperature of the article being baked indicates quite accurately the approach to and attainment of the desired internal cooking. Curves A, B, and C in the drawing illustrate, respectively, the rise in internal dough temperature with baking time in conventional roll baking, the conventional preliminary baking step for a brown and serve roll and in conventional bread baking. Curve D illustrates the rise in internal dough temperature in the process of the present invention. Comparison of the cooling portions of curves C and D contrast the in-pan partial cooling step of the conventional brown and serve process to the complete out-of-pan cooling step of the process of the present invention.

A still further difference in the present process lies in the addition of soda to the dough as a leavening agent. It has been found that small amounts of soda, about one quarter of one percent based on the total weight of the other ingredients, in addition to the conventionally used yeast, gives the semi-baked loaf better slicing and toasting qualities. Although the preferred process includes the addition of soda to the dough, good results may be obtained without its use.

In order to explain further the nature and details of the present invention, the following specific examples are given.

EXAMPLE 1

*Sponge Method*

With a standard bakery mixer, the following ingredients are combined:

| | Lbs. |
|---|---|
| Flour | 50 |
| Water | 29 |
| Yeast | 2¼ |
| Yeast food | ½ |

The mixture is whipped at high speed for 3 minutes and taken from the mixer at 70° F. This sponge then sets for 4 hours in a specially temperature controlled fermentation room and comes out at a temperature of 89° F. The mixture is then taken back to the mixer and the following ingredients added:

| | Lbs. |
|---|---|
| Flour | 50 |
| Water | 26 |
| Shortening | 6 |
| Sugar | 5 |
| Milk powder | 2 |
| Salt | 2¼ |
| Soda | ½ |
| Inhibitor | ¼ |

This entire mixture is then mixed at high speed for a period of 7 minutes and taken off at a temperature of 78° F. The dough is then allowed to set for 30 minutes floor time. Then it is divided into the desired size, molded and placed in pans, and placed in the proofer for 65 minutes. When the proofing is complete, the bread is placed in the oven for 50 minutes at 240° F. The product is then removed from the oven, and immediately removed from the pans and allowed to cool at least 4 or 5 hours at room temperature. After cooling the product is sliced into conventional toast-size pieces and packaged for distribution to the consumer. The slices when toasted either in an oven or in an electric toaster become substantially uniformly browned on all surfaces and possess a biscuit-like flavor not possessed by regular toast.

EXAMPLE 2

*Straight Dough Method*

| | Lbs. |
|---|---|
| Flour | 100 |
| Water | 55 |
| Yeast | 2 |
| Yeast food | ¼ |
| Shortening | 6 |
| Sugar | 5 |
| Milk | 2 |
| Salt | 2¼ |
| Soda | ½ |
| Inhibitor | ¼ |

All ingredients are placed in a mixer and mixed 6½ minutes at high speed with the temperature at 80° F.

The dough is allowed to ferment at room temperature for 2 hours and 30 minutes.

The dough is then taken to a divider to be divided into the desired size, molded into the desired shape, placed in pans, and placed in the overhead proofer for 65 minutes.

When proofing is completed, the bread is placed in the oven at a temperature of 240° F. for 50 minutes. The product is then removed from the oven, immediately taken from the pans and allowed to cool at least 4 or 5 hours at room temperature before further handling. After complete cooling, the product is sliced and packaged. As in the previous example, the slices when toasted have distinct biscuit-like flavor.

Thus, it will be appreciated that when conventional soft bread dough is subjected to the handling and baking process described above, the slices of the semi-baked product can be toasted in the home as desired to form an article of food having a distinct and superior flavor compared to that of regular toast. As pointed out above, the browning of the soft inner part of the bread, which has not previously been exposed to browning factors, produces in the slice the flavor of a freshly-baked biscuit. Thus, not only does the toast have an improved flavor, but it may be made quickly and easily, slice by slice, as desired. The latter feature provides the advantage that single biscuit-like articles may be made in a toaster at the table by the consumer without the usual oven preheating time required for regular brown and serve biscuit-like products. This is particularly advantageous when only one or two persons are to be served because not only is the oven time avoided but also the precise number of servings desired may be prepared.

It will be appreciated that minor variations in the exact details of the process may be made within the scope of this invention and that the details set forth above are not intended to be limitive except as they appear in the claims.

What is claimed is:

1. The method of preparing an incompletely cooked sliced loaf of bread intended to be later converted to toast of improved flavor which comprises: mixing a yeast bread dough; dividing said dough into loaf portions and immediately placing same in pans; proofing said dough into voluminous loaves; heating said proofed loaves to semi-cook the same until the starch is gelatinized; discontinuing heating before external browning of the dough and before said dough becomes completely cooked; immediately removing said loaves from the pans and allowing said loaves to cool naturally at room temperature for a sufficient period of time whereby the exterior thereof becomes sufficiently firm to withstand knife pressure without collapsing; and slicing said loaves into toast-sized pieces thereby exposing for subsequent toasting a large surface of semi-cooked dough which has not previously been exposed to browning factors and which produces when exposed to browning factors in a subsequent toasting process a flavor and appearance different from those of conventional toast.

2. The method of claim 1 wherein said panned loaves are baked at an oven temperature of about 240° F. for about 50 minutes.

3. The method of claim 1 wherein said dough is proofed at about 65° F. for about 65 minutes.

4. The method of claim 1 wherein said baked loaves cool for about 4 to 5 hours at a relative humidity of about 65%.

5. The method of claim 1 wherein about one quarter of one percent of soda is added to said yeast dough during said mixing step.

References Cited by the Examiner
UNITED STATES PATENTS

| | | | |
|---|---|---|---|
| 1,617,514 | 2/27 | Donovan et al. | 99—90 |
| 2,549,595 | 4/51 | Gregor | 99—90 |
| 3,061,441 | 10/62 | Halbach | 99—90 |

OTHER REFERENCES

Lord: "Everybody's Cook Book," Henry Holt & Co., New York, 1924, pp. 112 and 113 relied upon. TX 715.L86. Copy in Group 170.

"The Bakers Digest," December 1949, page 28.

A. LOUIS MONACELL, *Primary Examiner.*

TOBIAS E. LEVOW, RAYMOND N. JONES,
*Examiners.*